(12) United States Patent
Yeo

(10) Patent No.: US 10,233,895 B2
(45) Date of Patent: Mar. 19, 2019

(54) STEPWISE OPERATING PARALLEL TYPE SMALL HYDRO POWER GENERATION SYSTEM HAVING FIXED FLOW PATH

(71) Applicant: KEUNNAMU CO., LTD., Suwon-si (KR)

(72) Inventor: Ok Kyu Yeo, Suwon-si (KR)

(73) Assignee: KEUNNAMU CO., LTD., Suwon-si (KR)

( * ) Notice: Subject to any disclaimer, the term of this patent is extended or adjusted under 35 U.S.C. 154(b) by 0 days.

(21) Appl. No.: 15/950,132

(22) Filed: Apr. 10, 2018

(65) Prior Publication Data

US 2018/0313324 A1 Nov. 1, 2018

(30) Foreign Application Priority Data

Apr. 28, 2017 (KR) .................... 10-2017-0055103

(51) Int. Cl.
| | |
|---|---|
| *F03B 15/12* | (2006.01) |
| *F03B 15/18* | (2006.01) |
| *H02P 9/04* | (2006.01) |
| *H02P 9/10* | (2006.01) |
| *F03B 3/18* | (2006.01) |
| *H02P 101/10* | (2015.01) |

(52) U.S. Cl.
CPC .............. *F03B 15/12* (2013.01); *F03B 3/183* (2013.01); *F03B 15/18* (2013.01); *H02P 9/04* (2013.01); *H02P 9/107* (2013.01); *H02P 2101/10* (2015.01); *Y02E 10/22* (2013.01); *Y02E 10/226* (2013.01); *Y02E 10/28* (2013.01)

(58) Field of Classification Search
CPC .......... F03B 15/08; F03B 15/12; F03B 15/18; F03B 3/183; H02P 9/04; H02P 9/107

USPC ........................................................ 290/43
See application file for complete search history.

(56) References Cited

U.S. PATENT DOCUMENTS

| | | | |
|---|---|---|---|
| 6,602,044 B1 * | 8/2003 | Kuwabara | F03B 3/10 415/1 |
| 7,802,942 B2 * | 9/2010 | Cripps | E03F 3/00 290/1 R |
| 8,193,652 B2 | 6/2012 | Paoli | |
| 9,869,292 B2 | 1/2018 | Kang | |
| 2010/0140935 A1 * | 6/2010 | Paoli | F03B 3/103 290/43 |

(Continued)

FOREIGN PATENT DOCUMENTS

| | | |
|---|---|---|
| JP | 2010509537 A | 3/2010 |
| KR | 101544963 B1 | 8/2015 |

*Primary Examiner* — Sean Gugger
(74) *Attorney, Agent, or Firm* — IM IP Law; C. Andrew Im; Chai Im

(57) ABSTRACT

A stepwise operating parallel-type hydro power generation system having a fixed flow path includes a parallel pipe, a first power generation facility, a second power facility generation facility, first and second flow regulators, and a controller. The parallel pipe includes an inlet pipe, an outlet pipe, and a first straight pipe and a second straight pipe. The first and second straight pipes connected between the inlet pipe and the outlet pipe. Each of the first and second power generation facilities includes a water turbine rotating with the water introduced thereinto and a power generator operating according to the rotation of the water turbine. The controller is configured to open and close either or both of the first and second flow rate regulators at the same time.

4 Claims, 8 Drawing Sheets

(56) References Cited

U.S. PATENT DOCUMENTS

| | | | |
|---|---|---|---|
| 2014/0265328 A1* | 9/2014 | Van Blerk | F03B 11/004 |
| | | | 290/43 |
| 2015/0260151 A1* | 9/2015 | Kang | F03B 15/16 |
| | | | 700/282 |
| 2017/0298512 A1* | 10/2017 | Yamada | C23C 16/45565 |
| 2018/0205292 A1* | 7/2018 | Lee | H02K 9/06 |
| 2018/0224209 A1* | 8/2018 | Wong | F28B 7/00 |

* cited by examiner

STEPWISE OPERATING PARALLEL TYPE SMALL HYDRO POWER GENERATION SYSTEM HAVING FIXED FLOW PATH

BACKGROUND OF THE INVENTION

Field of the Invention

The present invention relates to a stepwise operating parallel type small hydro power generation system having a fixed flow path that is installed on pipes of a water treatment facility or small river to convert kinetic energy using water (pressure and flow rate of water) running along pipes into electric energy and thus to generate and supply electric power.

Background of the Related Art

Generally, water power generation is carried out by converting kinetic energy using pressure and flow rate of water produced by the flow of water into electric energy to generate electric power. The water power generation is divided into large capacity water power generation that blocks river or builds a dam to generate electric power through falling water levels of running water and small hydro power generation that is applied to small river, agricultural waterway, and various water treatment facilities and has a generating capacity of less than 15,000 kw.

The principle of the small hydro power generation is not different from that of the large capacity water power generation, but the small hydro power generation solves the problems (environmental destruction caused by large-scaled equipment, limitation in an area on which the large-scaled equipment is installable, and so on) the large capacity water power generation has had. The small hydro power generation is more eco-friendly than other power generation, is large in an amount of energy produced per unit capacity, and has no raw material depending upon other countries, so that the small hydro power generation can be widely used.

Representative water turbines used in existing small hydro power generation include a Pelton turbine, cross-flow turbine, Francis turbine, Kaplan turbine, tubular turbine, and so on.

Referring to Korean Patent Registration No. 10-1369522, for example, a small hydro power generation plant includes a turbine disposed on a flow path through which a fluid passes and having a body, a plurality of vanes disposed on the outer surface of the body in such a manner as to be adjustable in angle, and a plurality of vane-rotating shafts connected individually to the plurality of vanes in such a manner as to allow one end thereof to be coupled to the corresponding vane, a power generator for generating electric power according to the rotation of the turbine, and a controller electrically connected to an actuator to control the operation of the actuator in accordance with the change in the flow rate of the fluid passing through the flow path.

In the conventional practice, however, technical problems to be solved exist.

For example, the conventional small hydro power generation plants are generally built in areas where deviation in the change of flow rate of water supplied occurs severely, so that the power generator is overloaded or the water turbine is damaged. Accordingly, the flow rate of water should be regulated before the water is introduced into the power generation plant having the power generator and the water turbine.

In the conventional practice, at this time, the regulation in the flow rate of water is carried out by a flow rate adjusting valve or a guide vane of the water turbine, but if the flow rate adjusting valve is used to regulate the flow rate of water, it serves as a resistor to drastically increase loss in the pressure of water, thereby undesirably lowering power generation efficiency and failing to handle an instant pressure change to cause the power generator to be overloaded. Further, if the guide vane is used to regulate the flow rate of water, a hydraulic device for operating the guide vane is additionally needed to cause the water to be contaminated due to leakage of hydraulic oil, and also, the guide vane serves as a resistor to decrease the power generation efficiency. As the flow rate adjusting valve and the guide vane serve as the resistors, accordingly, a high voltage is applied to an inlet pipe, thereby undesirably causing the inlet pipe to be damaged or broken.

SUMMARY OF THE INVENTION

Accordingly, the present invention has been made in view of the above-mentioned problems occurring in the prior art, and it is an object of the present invention to provide a stepwise operating parallel type small hydro power generation system having a fixed flow path that is capable of handling deviation in the flow rate of water supplied to minimize resistance, constantly maintaining power generation efficiency, irrespective of the change in the flow rate of water, preventing unexpected overload or impacts caused by resistance from being applied to power generation facilities or pipes to protect them from breakage, and increasing a life span thereof.

To accomplish the above-mentioned object, according to the present invention, there is provided a stepwise operating parallel type small hydro power generation system having a fixed flow path, including: a parallel pipe having an inlet pipe for introducing water, an outlet pipe for discharging the introduced water, and a first straight pipe and a second straight pipe connected between the inlet pipe and the outlet pipe; a first power generation facility and a second power generation facility connected correspondingly to the first straight pipe and the second straight pipe and each having a water turbine rotating with the water introduced thereinto and a power generator operating according to the rotation of the water turbine to generate electric power; first flow rate regulators and second flow rate regulators adapted to adjust the flow rate of water introduced and discharged into/from the first power generation facility and the second power generation facility to control the flow rate of water for power generation; and a controller adapted to open and close either of the first flow rate regulators and the second flow rate regulators or both of the first flow rate regulators and the second flow rate regulators at the same time on the basis of a value sensed by a flow meter disposed on water introduction sides of the first power generation facility and the second power generation facility and power generation quantities of the first power generation facility and the second power generation facility, so that in correspondence with deviation in the flow rate of water introduced, either of the first power generation facility and the second power generation facility operates or both of the first power generation facility and the second power generation facility operate at the same time.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
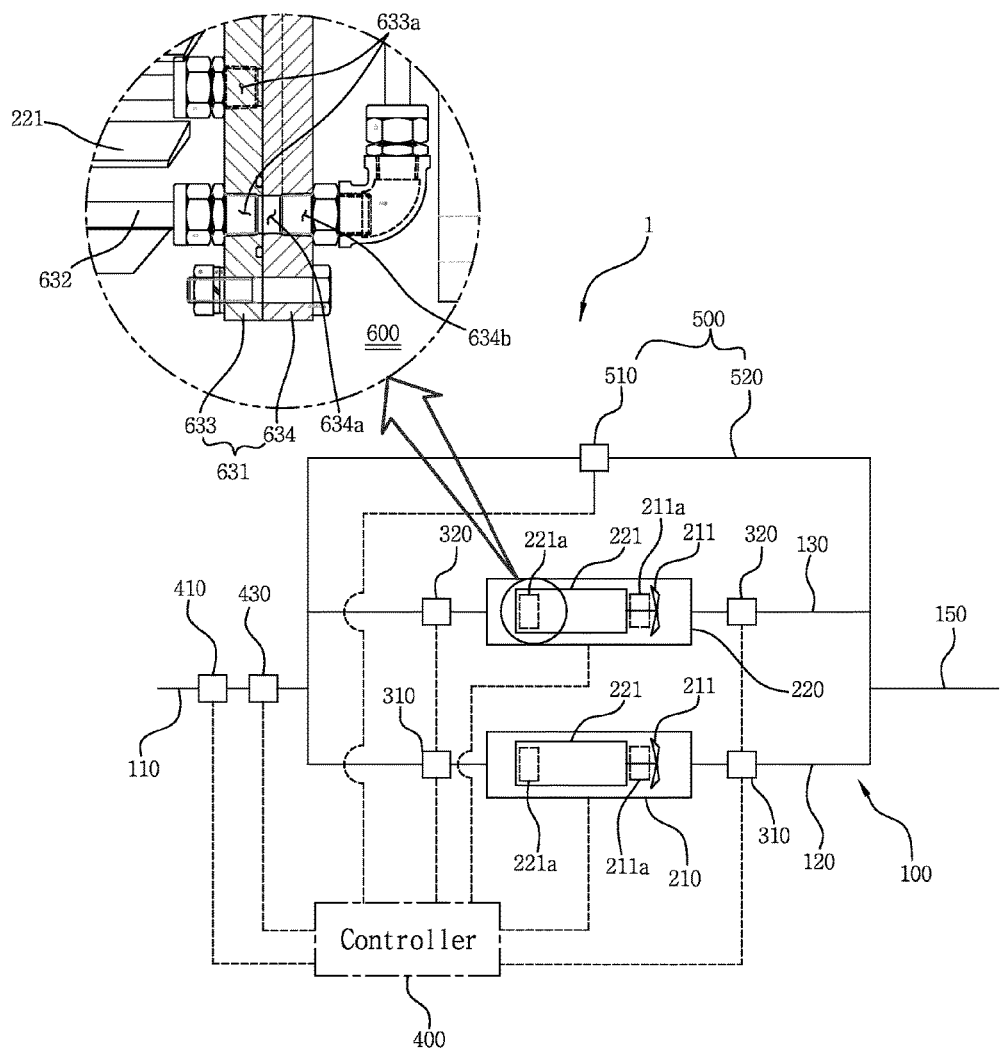
FIG. 1 is a diagram showing a configuration of a stepwise operating parallel type small hydro power generation system having a fixed flow path according to the present invention.

Now, an explanation on a stepwise operating parallel type small hydro power generation system having a fixed flow path according to the present invention will be given with reference to the attached drawings.

In the description, on the other hand, if it is determined that the detailed explanation on the well known technology related to the present invention makes the scope of the present invention not clear, the explanation will be avoided for the brevity of the description.

FIGS. 1 to 8 show a stepwise operating parallel type small hydro power generation system 1 having a fixed flow path 4 according to the present invention.

According to the present invention, first, the stepwise operating parallel type small hydro power generation system 1 having a fixed flow path largely includes a parallel pipe 100, a first power generation facility 210, a second power generation facility 220, first flow rate regulators 310, second flow rate regulators 320, and a controller 400.

Figure 2:
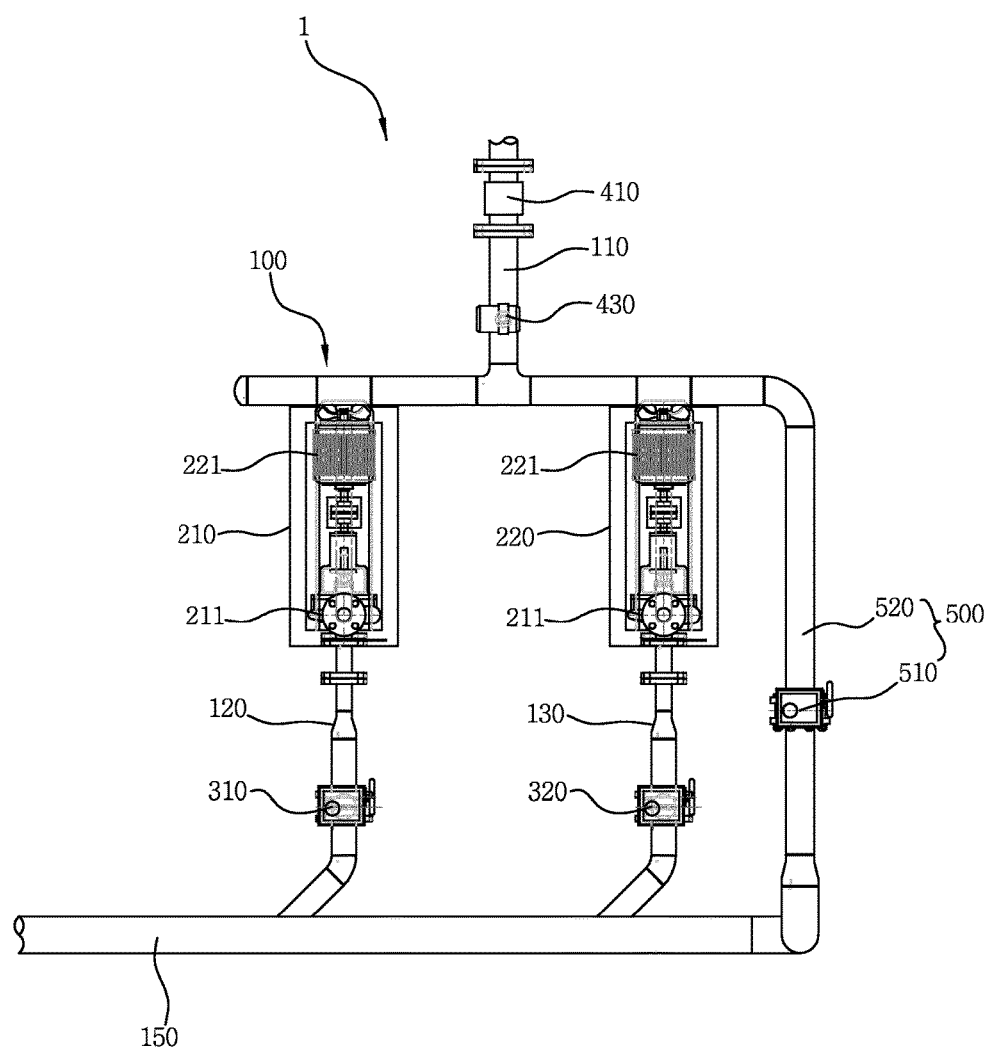
FIGS. 2 to 8 are exemplary views showing examples where the small hydro power generation system according to the present invention are applied to various power plants.

Hereinafter, the respective parts of the stepwise operating parallel type small hydro power generation system 1 having a fixed flow path according to the present invention will be in detail explained with reference to FIGS. 1 and 2. FIG. 1 shows a configuration of the small hydro power generation system 1 according to the present invention, and FIG. 2 shows an application example of the small hydro power generation system 1 according to the present invention.

First, the parallel pipe 100 includes an inlet pipe 110 for introducing water, an outlet pipe 150 for discharging the introduced water, and a first straight pipe 120 and a second straight pipe 130 connected between the inlet pipe 110 and the outlet pipe 150.

In detail, the parallel pipe 100 is a pipe along which water flows and is connected between pipes of a water treatment facility or small river to allow the water to be introduced therein and discharged therefrom. The parallel pipe 100 has excellent durability and is strongly resistant to corrosion caused by water.

Further, the parallel pipe 100 includes the inlet pipe 110 for introducing water, the outlet pipe 150 for discharging the introduced water, and the first straight pipe 120 and the second straight pipe 130 connected between the inlet pipe 110 and the outlet pipe 150 to allow the water introduced through the inlet pipe 110 to pass therethrough and also to allow the water passing through the outlet pipe 150 to be introduced thereinto.

The inlet pipe 110, the outlet pipe 150, the first straight pipe 120, and the second straight pipe 130 are hollow pipes and are connectable to the pipes of the water treatment facility or small river to which the small hydro power generation system 1 is applied. They may have various lengths and shapes under the condition where they have the functions of pipes along which water flows.

On the inlet pipe 110, in this case, are provided a flow meter 410 for providing data obtained by sensing the flow rate of water introduced in real time and a pressure gauge 430 for providing data obtained by sensing the pressure of water therein in real time.

The flow meter 410 measures the flow rate of water, and the pressure gauge 430 measures the pressure of water in the pipe. The measured data is utilized through the controller 400.

The middle portions of the first straight pipe 120 and the second straight pipe 130 are connected to the first power generation facility 210 and the second power generation facility 220 by means of pipe connection to allow the water to pass therethrough. For the convenience of explanation, the first straight pipe 120, the second straight pipe 130, the first power generation facility 210, and the second power generation facility 220 are denoted herein, but they do not limit the number of pipes and facilities installed. If necessary, the number of pipes and facilities may be increased or decreased.

In this case, the parallel pipe 100 further includes a bypass pipe 500 connected between the inlet pipe 110 and the outlet pipe 150 by means of a third straight pipe 520, so that if allowable power generation quantities of the first power generation facility 210 and the second power generation facility 220 exceed set values, a degree of openness of a third flow rate regulator 510 mounted on the third straight pipe 520 is slowly increased to allow water to be introduced into the third straight pipe 510, and accordingly, the flow rate of water introduced into the first straight pipe 120 and the second straight pipe 130 is decreased to allow the generation quantities to be reduced.

The bypass pipe 500 is connected between the inlet pipe 110 and the outlet pipe 150 by means of the third straight pipe 520 and has the third flow rate regulator 510 mounted on the third straight pipe 520. In this case, the shape of the bypass pipe 500 is the same as the first straight pipe 120 and the second straight pipe 130, but the bypass pipe 500 has the third flow rate regulator 510 mounted thereon, while the first straight pipe 120 and the second straight pipe 130 have the first power generation facility 210 and the second power generation facility 220. For the brevity of the description, the bypass pipe 500 is denoted herein.

In normal case, the third flow rate regulator 510 is kept closed to allow water to be introduced into the first straight pipe 120 and the second straight pipe 130, and if the allowable power generation quantities of the first power generation facility 210 and the second power generation facility 220 exceed the set values, the third flow rate regulator 510 is arbitrarily open and closed.

Further, the first power generation facility 210 and the second power generation facility 220 are connected correspondingly to the first straight pipe 120 and the second straight pipe 130 to allow water turbines 211 to rotate with the water introduced thereinto to operate power generators 221, thereby generating electric power from the power generators 221.

The first power generation facility 210 is connected to the first straight pipe 120 by means of pipe connection, and the second power generation facility 220 is connected to the second straight pipe 130 by means of pipe connection, so that if the water introduced through the inlet pipe 110 is supplied to the first power generation facility 210 and the second power generation facility 220 by means of the first straight pipe 120 and the second straight pipe 130, the water passing through the first power generation facility 210 and the second power generation facility 220 is discharged through the outlet pipe 150. Accordingly, the pressure of water caused by the flow rate of water, that is, kinetic energy is converted into electric energy, thereby performing power generation.

Further, the first power generation facility 210 and the second power generation facility 220 include the water turbines 211 adapted to rotate with the pressure of water and the flow rate of water to transfer the kinetic energy generated by the rotation to the power generators 221 and the power generators 221 connected to the water turbines 211 to generate and supply electric power through the rotating power received from the water turbines 211.

Each water turbine 211 is a rotary body having a plurality of vanes, to which pressure of water is applied, equally spaced apart from each other on a shaft connected to the corresponding power generator 221, and of course, the water turbine 211 may have various shapes in accordance with situations to which the small hydro power generation system 1 according to the present invention is applied. Further, the water turbine 211 selectively includes a guide vane and a flow rate adjusting valve adapted to control the flow rate of water passing therethrough.

Each power generator 221 is connected to the water turbine 211 by means of the shaft thereof and is selectively disposed inside or outside the parallel pipe 100. Further, the power generator 221 may have various shapes under the condition where it receives the kinetic energy from the water turbine 211 and converts the kinetic energy into the electric energy.

In this case, if the allowable power generation quantities of the first power generation facility 210 and the second power generation facility 220 exceed the set values, the water turbine 211 further includes a brake 211a adapted to stop the rotation thereof to prevent the allowable power generation quantities of the first power generation facility 210 and the second power generation facility 220 from exceeding the set values.

The brake 211a is a kind of brake that performs a braking function of increasing or decreasing the number of revolutions per minute of the water turbine 211 through a frictional force caused by mechanical pressurization against the shaft of the power generator 221. The brake 211a is disposed on the shaft of the power generator 221 connected to the water turbine 211 to apply the braking function to the water turbine 211, and if the allowable power generation quantity exceeds the set value, the brake 211a automatically operates under the control of the controller 400 to control the rotation of the water turbine 21, thereby in advance preventing occurrence of overload.

In addition, the power generator 221 includes a cooler 600 coming into direct contact with the outer side of the power generator 221 to allow cooling water to be continuously supplied and circulated to a cooling flow path 632 and thus to cool the heat generated from the power generator 221 through the cooling operation caused by heat exchange of the cooling water.

In this case, the cooler 600 includes: a pair of hollow circular plate-shaped branched plates 631 coupled to both ends of the power generator 221 and having a ring-shaped supply hole 634a and a plurality of branched holes 633a formed at the insides thereof in such a manner as to allow the cooling water to be supplied through the supply hole 634a to branch the cooling water through the plurality of branched holes 633a. The cooling flow path 632 is adapted to perform a cooling operation on the outer surface of the power generator 221 and having both ends connected to the branched holes 633a in such a manner as to be placed between the pair of branched plates 631 to allow the branched cooling water to be supplied individually to the branched holes 633a.

The branched plates 631 are plates that have the corresponding sizes to the side size of the power generator 221 and through holes formed on the centers thereof in such a manner as to be fitted to the power generator 221. In detail, the branched plates 631 are formed of an inner plate 633 and an outer plate 634 doubly folded to each other. The outer plate 634 has the ring-shaped supply hole 634a, and the inner plate 633 has the branched holes 633a formed inside the supply hole 634a in such a manner as to be connected to the cooling flow path 632. At this time, the outer plate 634 has a cooling water hole 634b formed thereon in such a manner as to be connected to the supply hole 634a to supply and discharge the cooling water thereto and therefrom.

The cooling flow path 632 has a shape of a hollow pipe that has both ends connected to the branched holes 634b in such a manner as to be placed between the pair of branched plates 631 and comes into close contact with the outer surface of the power generator 221, so that the cooling water supplied through the pair of branched plates 631 is circulated through the cooling flow path 632 and is cooled through the heat exchange on the outer surface of the power generator 221.

Further, the cooling flow path 632 has a large inner diameter on the side to which the cooling water is first supplied and a small inner diameter on the side from which the cooling water is discharged, so that quantities of cooling water introduced and discharged are different from each other to allow the cooling water supplied to the cooling flow path 632 to be full inside the cooling flow path 632.

On the other hand, the cooler 600 supplies the cooling water by means of an electric valve and adjusts a degree of openness of the electric valve on the basis of a signal generated by sensing and transmitting a temperature of the power generator 221 in real time by means of a temperature sensor, so that a cooling temperature of the power generator 221 is controlled in accordance with a quantity of cooling water supplied.

Further, the first flow rate regulators 310 and the second flow rate regulators 320 serve to adjust the flow rate of water introduced and discharged into/from the first power generation facility 210 and the second power generation facility 220 to control the flow rate of water for power generation.

The first flow rate regulators 310 and the second flow rate regulators 320 have valves disposed on the water introduction sides and the water discharge sides of the first power generation facility 210 and the second power generation facility 220, and the valves are formed of electric valves, mechanical valves, etc. At this time, degrees of openness of the first flow rate regulators 310 and the second flow rate regulators 320 are controlled under the control of the controller 400.

Further, the controller 400 serves to open and close either of the first flow rate regulators 310 and the second flow rate regulators 320 or both of them at the same time on the basis of a value sensed by the flow meter 410 disposed on the water introduction sides of the first power generation facility 210 and the second power generation facility 220 and the power generation quantities of the first power generation facility 210 and the second power generation facility 220, so that in accordance with the deviation in flow rate of water introduced, either of the first power generation facility 210 and the second power generation facility 220 operates or both of the first power generation facility 210 and the second power generation facility 220 operate at the same time.

Further, the controller 400 includes the flow meter 410 disposed on the water introduction side to measure the flow rate of water introduced and the pressure gauge 430 disposed on the water introduction side to measure the pressure of water. The flow meter 410 and the pressure gauge 430 are sensors for measuring the flow rate and pressure of water and provide the measured data in real time.

Further, the controller 400 includes a processor having a memory where appropriate set values for flow rate of water, pressure of water, power generation quantities, and rotation speeds of the water turbines desirably operating in the small hydro power generation system 1 are in advance stored.

The flow rate and pressure of water measured by the flow rate 410 and the pressure gauge 430 are supplied to the processor of the controller 400, and the measured values are stored in the memory. On the basis of the appropriate set values stored in the memory, the processor provides parameters related to the power generation of the small hydro power generation system 1 inclusive of degrees of openness of the first flow rate regulators 310 and the second flow rate regulators 320 and the power generation quantities of the first power generation facility 210 and the second power generation facility 220, thereby making it possible to perform automatic adjustment to optimal power generation quantities according to the flow rate and pressure of water introduced.

If there is a need to adjust the flow rate of water introduced into the water turbines 211, without using the first flow rate regulators 310 and the second flow rate regulators 320, the controller 400 increases output values of inverters 221a of the power generators 221 to reduce the number of revolutions per minute of the water turbines 211, so that the flow rate of water introduced is decreased. Otherwise, the controller 400 decreases the output values of the inverters 221a to increase the number of revolutions per minute of the water turbines 211, so that the flow rate of water introduced is increased.

The number of revolutions per minute of the water turbines 211 is arbitrarily regulated in accordance with the adjustment of the output values of the inverters 221a, and the flow rate of water introduced is arbitrarily regulated in accordance with the number of revolutions per minute of the water turbines 211.

At this time, if the flow rate of water introduced or the pressure of water is increased to cause the number of revolutions per minute of the water turbines 211 to be increased, the output values of the inverters 221a of the power generators 221 are increased to cause the number of revolutions per minute of the water turbines 211 to be decreased.

If the flow rate of water introduced or the pressure of water is decreased to cause the number of revolutions per minute of the water turbines 211 to be reduced, the output values of the inverters 221a of the power generators 221 are decreased to cause the number of revolutions per minute of the water turbines 211 to be increased.

Now, an explanation on a power generation process using the controller 400 of the small hydro power generation system 1 according to the present invention will in more detail given. In the small hydro power generation system 1 having the first power generation facility 210 and the second power generation facility 220 in which water has a flow rate of 0.5 m$^3$/s, for example, if the water is introduced at the rate of 0.8 m$^3$/s, the first flow rate regulators 310 of the first power generation facility 210 are open fully to 100% under the control of the controller 400 according to the flow rate of water introduced, so that the flow rate of 0.5 m$^3$/s of the flow rate of water introduced at the maximum power generation efficiency of the water turbine 211 is used, and the second flow rate regulators 320 of the second power generation facility 310 increase and decrease the number of revolutions per minute of the water turbine 211 by the flow rate of 0.3 m$^3$/s of the flow rate of water introduced. Accordingly, resistances caused by the first flow rate regulators 310 and the second flow rate regulators 320 are minimized to maximize power generation efficiency, so that the first power generation facility 210 operates to efficiency of 100% and the second power generation facility 220 operates to optimal efficiency lower than the maximum efficiency, thereby maximizing the energy efficiency according to the flow rate of water introduced.

In the small hydro power generation system 1 having the first power generation facility 210 and the second power generation facility 220 in which water has a flow rate of 0.5 m$^3$/s, further, if the water is introduced at the rate of 0.6 m$^3$/s, any one of the first power generation facility 210 and the second power generation facility 310 is closed to stop the power generation under the control of the controller 400 according to the flow rate of water introduced, and the other increases and decreases the number of revolutions per minute of the water turbine 211 to allow the water to be introduced at the flow rate of 0.6 m$^3$/s. Accordingly, resistances caused by the first flow rate regulators 310 and the second flow rate regulators 320 are minimized to maximize the power generation efficiency, so that energy loss is minimized and power generation is maximized.

As mentioned above, if raw water is introduced into the small hydro power generation system 1, it is sensed by the flow meter 410 to allow the first power generation facility 210 to be first open, and if the flow rate or power generation quantity of the first power generation facility 210 exceeds an allowable value, the second power generation facility 220 is open. Further, if the flow rate or power generation quantity of the second power generation facility 220 exceeds an allowable value, the bypass pipe 500 is open to prevent occurrence of overload.

Referring to the adjustment in the number of revolutions per minute using the inverter 221a, on the other hand, the water turbine 211 and the power generator 221 are connected serially to each other, and the number of revolutions per minute of the water turbine 211 is adjustable through the regulation in the output of the power generator 221.

At this time, the output of the power generator 221 is set in correspondence with the number of revolutions per minute of the water turbine 211, and as the output, that is, power of the power generator 221 is voltage×current, the current is adjusted by the inverter 221a disposed on the power generator 221. If the flow rate of water or the pressure of water is increased to cause the number of revolutions per minute of the water turbine 211 to be increased, the current of the power generator 221 is increased to allow the water turbine 211 to rotate to the number of revolutions per minute set, and contrarily, if the flow rate of water or the pressure of water is decreased to cause the number of revolutions per minute of the water turbine 211 to be reduced, the current of the power generator 221 is decreased to allow the number of revolutions per minute of the water turbine 211 to be increased. In detail, a quantity of current serves as a resistor for regulating the number of revolutions per minute of the water turbine 211, and accordingly, if a quantity of current of the power generator 221 is increased through the inverter 221a, the number of revolutions per minute of the water turbine 211 is reduced. Contrarily, if a quantity of current of the power generator 221 is decreased through the inverter 221a, the number of revolutions per minute of the water turbine 211 is raised to handle the flow rate of water introduced.

Therefore, the small hydro power generation system 1 according to the present invention includes the first power generation facility 210 and the second power generation facility 220 each having the power generator 221 and the water turbine 211, so that on the basis of the values obtained by in real time sensing the flow rate of water or power generation quantities supplied thereto, the small hydro power generation system 1 determines the operation in either of the first power generation facility 210 and the second power generation facility 220 or the operations in both of them, or regulates the output of the first power generation facility 210 to directly handle the deviation in the flow rate of water, thereby constantly maintaining the power generation efficiency, irrespective of the change in the flow rate of water, preventing unexpected overload and impact caused by resistance pressure from being applied to the power generation facilities or pipes to protect the power generation facilities or pipes from breakage, and increasing a life span thereof.

On the other hand, FIGS. 2 to 8 are exemplary views showing examples where the small hydro power generation system 1 according to the present invention are applied to various power plants.

For example, the small hydro power generation system 1 having the above-mentioned configuration according to the present invention is applied to any one of a single stage pump small hydro power plant, an axial flow pump small hydro power plant, an inline pump small hydro power plant, a line screw small hydro power plant, an external line screw small hydro power plant, a double suction pump small hydro power plant, and a multistage pump small hydro power plant.

Figure 3:
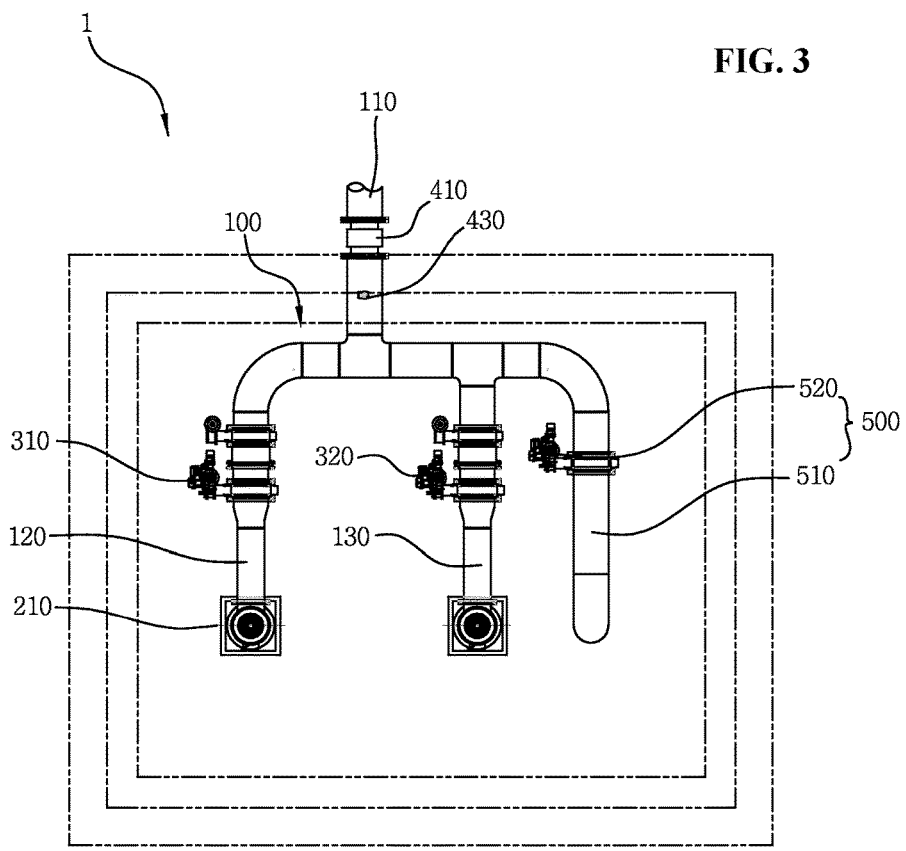
Figure 3:
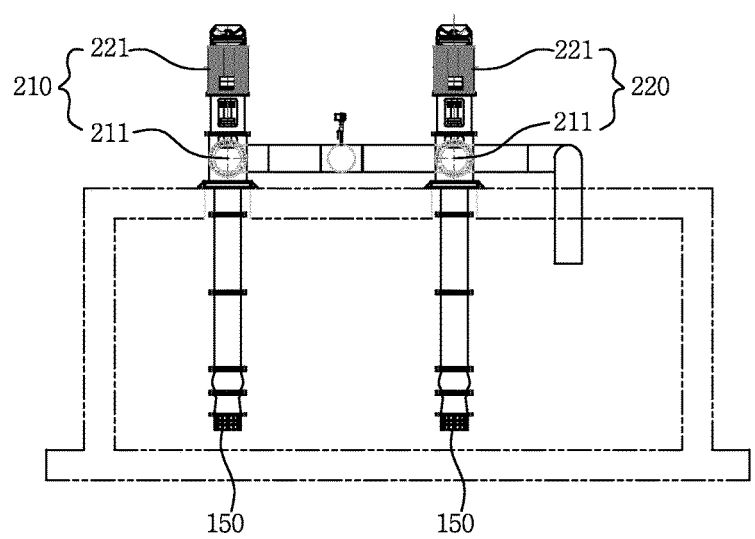
Figure 4:
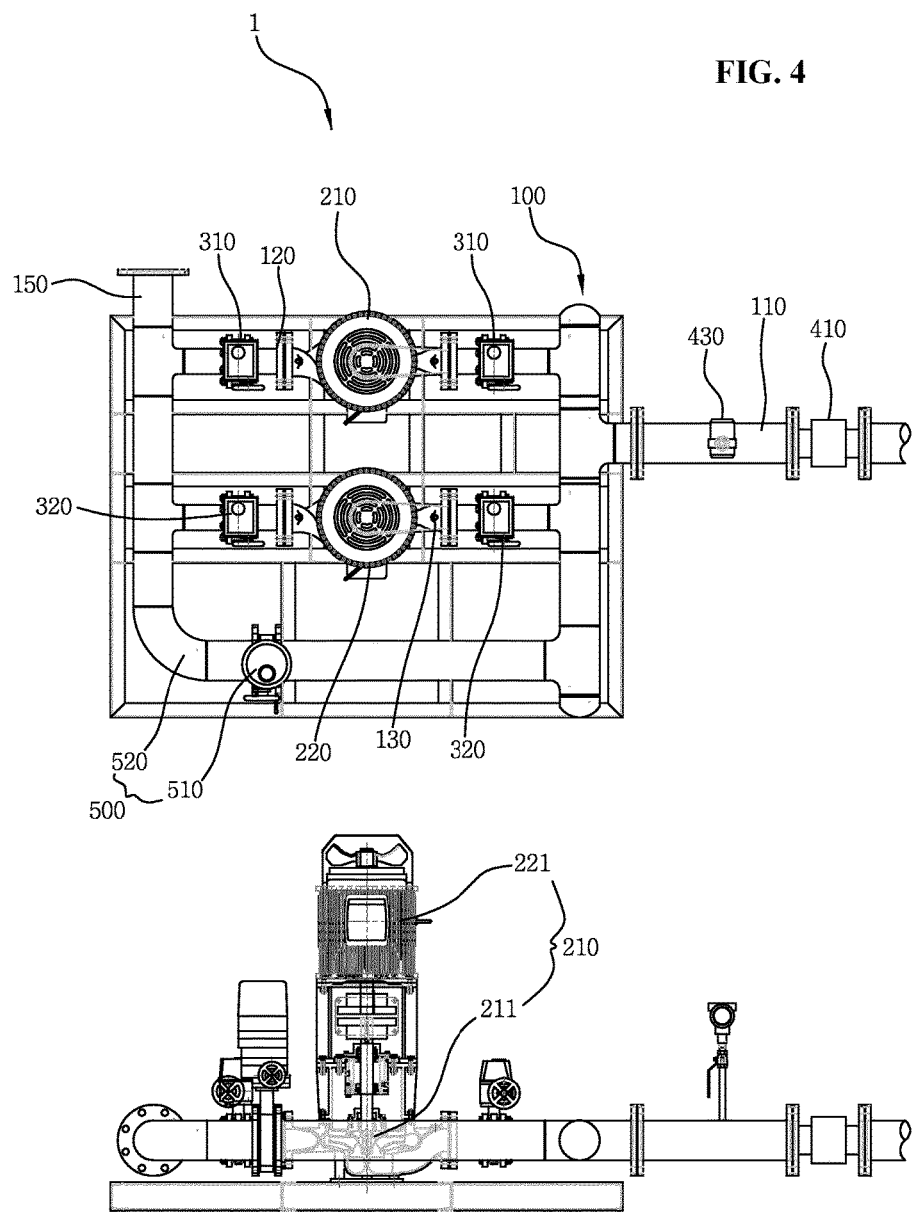
Figure 5:
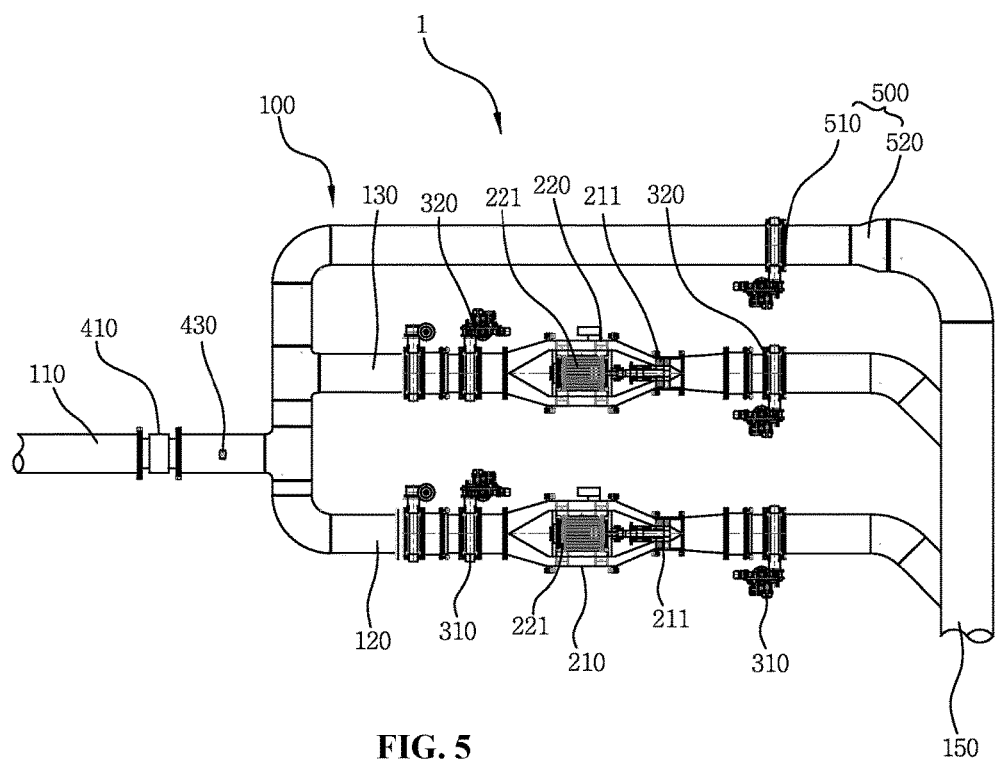
Figure 6:
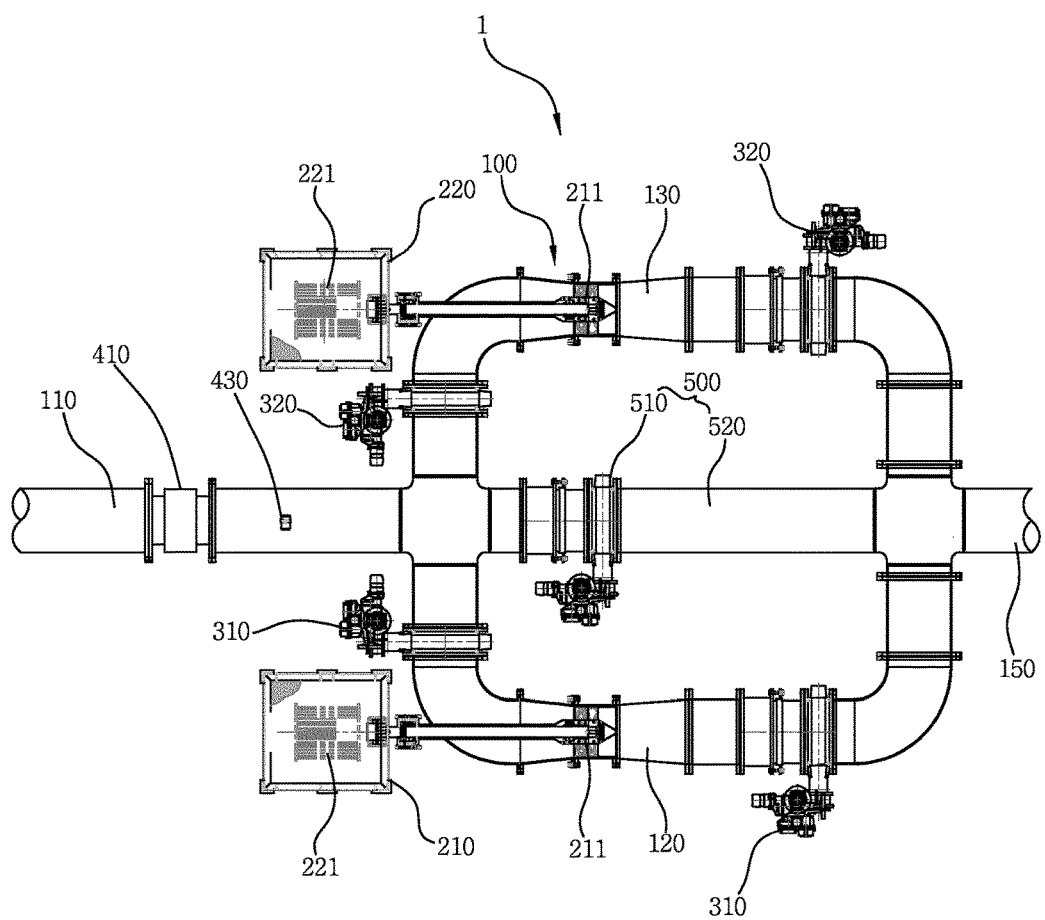
Figure 7:
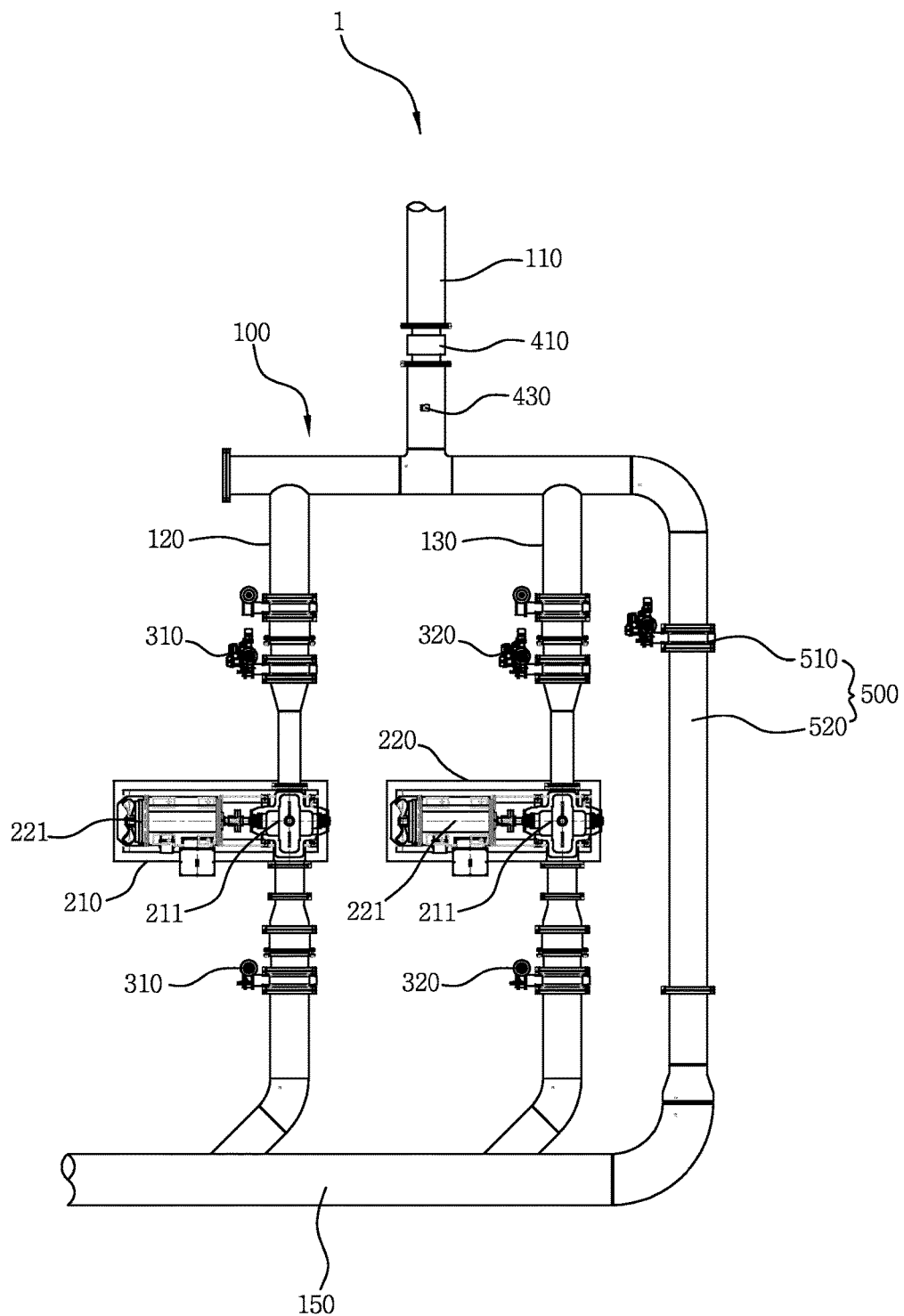
Figure 8:
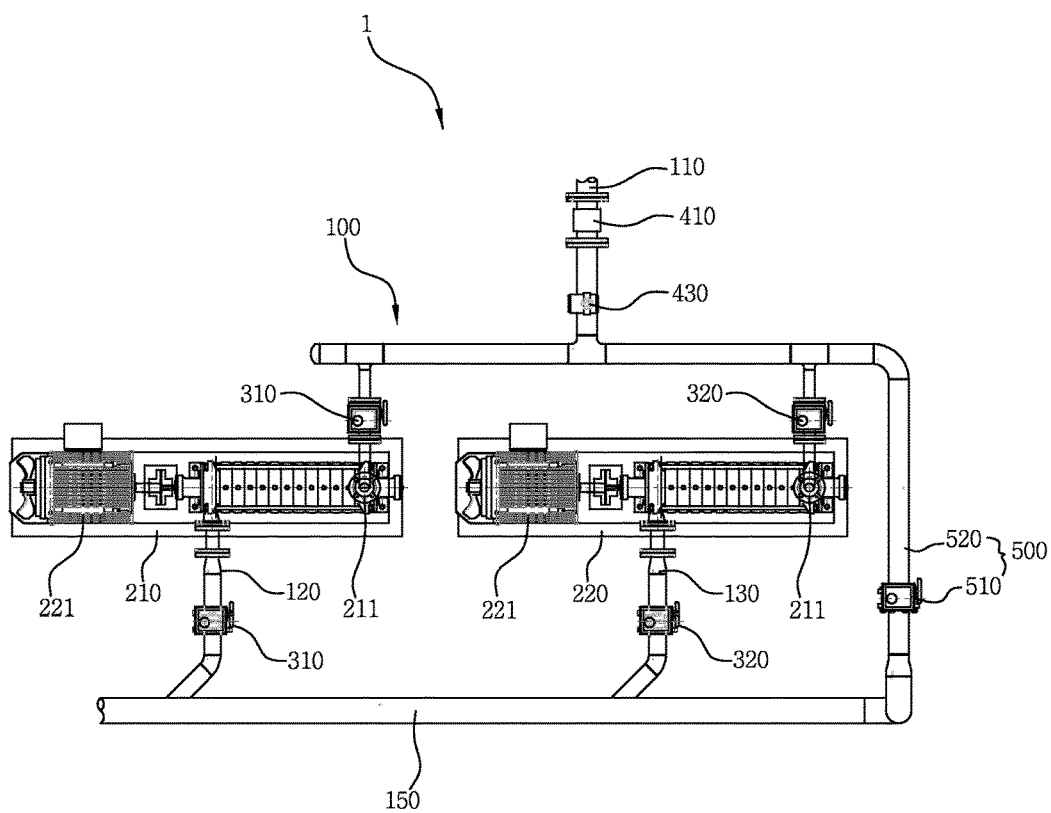

FIG. 2 shows an example where the present invention is applied to the single stage pump small hydro power plant, FIG. 3 shows an example where the present invention is applied to the axial flow pump small hydro power plant, FIG. 4 shows an example where the present invention is applied to the inline pump small hydro power plant, FIG. 5 shows an example where the present invention is applied to the line screw small hydro power plant, FIG. 6 shows an example where the present invention is applied to the external line screw small hydro power plant, FIG. 7 shows an example where the present invention is applied to the double suction pump small hydro power plant, and FIG. 8 shows an example where the present invention is applied to the multistage pump small hydro power plant.

According to the present invention, on the other hand, the first power generation facility 210 and the second power generation facility 220 are basically provided, and for the brevity of description, they are dividedly denoted. If necessary, however, only the first power generation facility 210 is used, or other power generation facilities having the same configurations as the first power generation facility 210 and the second power generation facility 220 may be additionally provided.

As described above, the small hydro power generation system according to the present invention includes the plurality of power generation facilities each having the power generator and the water turbine, so that on the basis of the values obtained by in real time sensing the flow rate of water or power generation quantities supplied thereto, the small hydro power generation system determines the operation in either of the plurality of power generation facilities or the operations in both of them, or regulates the outputs of the plurality of power generation facilities to decrease or increase the number of revolutions per minute of the water turbines and thus to directly handle the deviation in the flow rate of water, thereby constantly maintaining the power generation efficiency, irrespective of the change in the flow rate of water, preventing unexpected overload and impact caused by resistance pressure from being applied to the power generation facilities or pipes to protect the power generation facilities or pipes from breakage, and increasing the life span thereof.

The preferred embodiment of the present invention has been disclosed in the specification and drawings, but special terms are used not to limit the present invention and the scope of the present invention as defined in claims, but just to explain the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A stepwise operating parallel-type hydro power generation system having a fixed flow path, comprising:
   a parallel pipe comprising an inlet pipe to introduce water, an outlet pipe to discharge the water, a first straight pipe and a second straight pipe, the first and second straight pipes connected to and between the inlet pipe and the outlet pipe;
   a first power generation facility and a second power generation facility connected respectively to the first straight pipe and the second straight pipe, each of the first and second power generation facilities comprising a water turbine rotating with the water introduced thereinto and a power generator operating according to a rotation of the water turbine to generate electric power;
   first flow rate regulators and second flow rate regulators configured to adjust a flow rate of the water introduced into and discharged from the first power generation facility and the second power generation facility to control the flow rate of the water for power generation;
   a controller configured to open and close either or both of the first flow rate regulators and the second flow rate regulators at the same time, in accordance with a value sensed by a flow meter disposed on water introduction sides of the first power generation facility and the second power generation facility, and in accordance with power generation quantities of the first power generation facility and the second power generation facility, such that either or both of the first power generation facility and the second power generation facility operate at the same time in accordance with a deviation in the flow rate of the water introduced; and
   wherein each power generator comprises a cooler in a direct contact with an outer side of said each power generator to continuously supply and circulate a cooling water to a cooling flow path, thereby cooling said each power generator through a heat exchange with the cooling water, the cooler is a hollow circular plate coupled to an end of said each power generator, the hollow circular plate is formed of a first plate and a second plate, the first plate comprises a ring-shaped supply hole, and the second plate comprises a plurality of holes positioned to correspond to a location of the ring-shaped supply hole on the first plate and the hollow circular plate is configured to supply the cooling water through the ring-shaped supply hole and through the plurality of holes; and wherein both ends of the cooling flow path are connected to the plurality of holes between the first and second plates to individually supply the cooling water to the plurality of holes.

2. The stepwise operating parallel-type hydro power generation system according to claim 1, wherein the controller is configured to adjust the flow rate of the water introduced into the water turbines without using the first flow rate regulators and the second flow rate regulators, the controller increases output values of inverters of the power generators to reduce a number of revolutions per minute of the water turbines to decrease the flow rate of the water introduced and the controller decreases the output values of the inverters to increase the number of revolutions per minute of the water turbines to increase the flow rate of the water introduced, such that the number of revolutions per minute of the water turbines is regulated by adjusting the output values of the inverters, and the flow rate of the water introduced is regulated in accordance with the number of revolutions per minute of the water turbine.

3. The stepwise operating parallel-type hydro power generation system according to claim 1, wherein the water turbines further comprise brakes configured to stop the rotation of the water turbines to prevent allowable power generation quantities of the first power generation facility and the second power generation facility (220) from exceeding predetermined set values.

4. The stepwise operating parallel-type hydro power generation system according to claim 1, wherein the parallel pipe further comprises a bypass pipe connected between the inlet pipe and the outlet pipe by a third straight pipe; and wherein in response to a determination that allowable power generation quantities of the first power generation facility and the second power generation facility exceed to predetermined set values, the controller is configured to increase a degree of openness of a third flow rate regulator mounted on the third straight pipe to allow the water to be introduced into the third straight pipe, to decrease the flow rate of water introduced into the first straight pipe and the second straight pipe, and to reduce the power generation quantities.

* * * * *